Oct. 16, 1962     H. L. WARD     3,058,225
PROBING INSTRUMENT AND DEPTH INDICATOR
Filed April 1, 1958
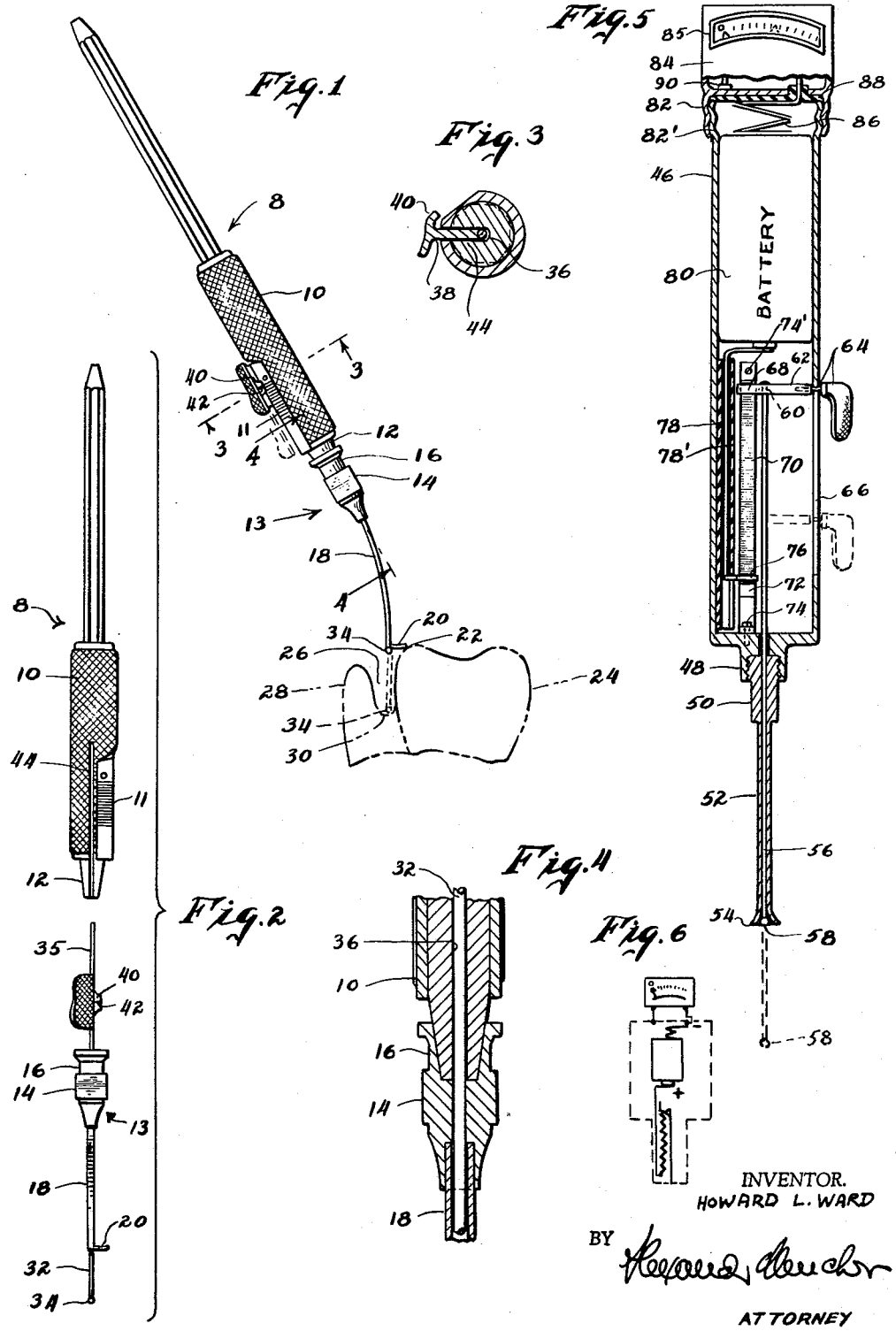
INVENTOR.
HOWARD L. WARD
BY
ATTORNEY

United States Patent Office 3,058,225
Patented Oct. 16, 1962

3,058,225
PROBING INSTRUMENT AND DEPTH INDICATOR
Howard L. Ward, 35 Wensley Drive, Great Neck, N.Y.
Filed Apr. 1, 1958, Ser. No. 725,531
2 Claims. (Cl. 33—172)

This invention relates generally to surgical and dental instruments, but more particularly to an instrument employed as a probe gauge for measuring the depth of pyorrhea pockets or other penetrable parts of a living body.

Specifically, an important object of the invention is to provide a device of the above-mentioned character, which will make it possible to accurately measure the depth of a pyorrhea pocket in a human or animal gum.

A further object of the invention resides in the provision in such a device of calibrating means for enabling an easy and prompt reading of the measurement taken.

Another object of the invention resides in the provision of an instrument which is light in weight and easy to manipulate.

A further object of the invention resides in the provision of such a device which is readily disassemblable for cleaning or sterilization.

Another object of the invention resides in the provision of such a device which is simple in design and inexpensive to manufacture.

Other objects and incidental ends and advantages of the invention will hereinafter be set forth in the progress of the disclosure and in the appended claims.

The accompanying drawing shows preferred forms of the invention wherein:

FIGURE 1 is a side view in elevation of one embodiment of the invention in the form of a probe gauge, and shows the manner of its employment;

FIGURE 2 is a disassembled view of the device shown in FIGURE 1;

FIGURE 3 is a cross-sectional view taken on plane 3—3 of FIGURE 1;

FIGURE 4 is a central vertical section taken on plane 4—4 of FIGURE 1;

FIGURE 5 is an elevational view in partial section of another embodiment of a probe gauge; and FIGURE 6 is a diagrammatic representation of the circuit employed in the embodiment according to FIGURE 5.

Referring now to the views of the drawing in detail, there is shown in FIGURE 1 an instrument handle 8 formed with an enlarged grip part 10 provided with a calibrated scale 11. Either the metric or English system of measurement may be employed. For accurate measurement the scale is calibrated in millimeters or in thousands of an inch.

Grip part 10 is formed with a nub 12 adapted for frictional engagement with a coupling portion 14 of a depth probe member 13 having an attaching nipple 16. Secured to coupling 14 and depending therefrom is a curved sleeve 18 which, if desired, may be provided with an end part or offset extension 20 for contacting the edge 22 of a tooth 24, adjacent a pyorrhea pocket or cavity 26 in gum 28, to serve as a reference point for the measurement of the distance between the edge of the tooth and bottom 30 of the cavity. The instrument handle and the depth probe member are preferably made of stainless steel, although aluminum or any suitable metal alloy may be employed.

As may be seen further from FIGURES 2–4, there is slidably disposed in sleeve 18 a flexible depth probe needle 32 formed with a ball-like extremity 34, which is adapted to reciprocably extend into a pyorrhea pocket or cavity 26 and to contact the bottom 30 thereof, as shown by dotted lines in FIGURE 1. The depth of such pocket or cavity may be determined by reference to the movement of needle end 35 relative to scale 11. This latter end extends through coupling 14 into central longitudinal bore 36 of grip part 10. Secured adjacent the inner end 35 of the needle is an angle piece 38 formed with an index element 40 on which is impressed reference mark 42. Angle piece 38 is adapted to slide in frictional engagement with a slot 44, which communicates with bore 36 adjacent exteriorly calibrated scale 11 marked on the grip part of the handle. The index element is thus movable on the exterior of the grip part.

When probe member 13 is secured to handle 8 by the means above described, the distance which the extremity 34 extends into a pyorrhea pocket or cavity 26 from end part or offset extension 20 may be read by reference to the position of mark 42 on index element 40 with relation to calibrated scale 11.

To measure the depth of a pyorrhea pocket or cavity, index mark 42 is set at the zero indication of scale 11 as shown in FIGURE 1. In this position needle 32 will have been fully withdrawn into sleeve 18 and the needle's extremity 34 is flush with the end part or offset extension 20 of sleeve 18. End part 20 is held in contact with the upper edge of the tooth adjoining the pyorrhea pocket with the instrument handle tilted at a convenient angle as indicated in FIGURE 1. Index element 40 is made to slide in a generally downward direction, thereby moving probe needle 32 out of sleeve 18, until extremity 34 contacts the bottom 30 of the pyorrhea pocket. The distance between the needle's extremity 34 and offset extension 20 may then be readily determined by reference to the position of the mark 42 on the index element 40 relative to the calibrations of scale 11. A record of the measurement may be made while the instrument is thus held, or the instrument may be withdrawn and a record made later. The probe member may be readily sterilized for subsequent employment by detaching it from the handle or the entire assembly can be sterilized as a unit.

While the instrument described above consists of a handle and a detachable probe member, it is to be understood that both of these may be formed integrally without departing from the basic concept of the invention.

In another embodiment of the invention, as illustrated in FIGURES 5 and 6, a hollow cylindrically-shaped metal handle 46 is formed with an interiorly threaded nub 48 to which is secured by means of a threaded nipple 50, a sleeve 52. The sleeve is provided with an offset extension 54. The handle, nipple and sleeve are preferably made of stainless steel, although any appropriate metal or metal alloy may be employed. Slidably extending through sleeve 52 and into handle 64 is a depth probe needle 56 formed with a ball-like extremity 58. There is secured to the other end of the needle at 60 a guide pin 62, to which in turn is attached an angular extension 64 frictionally guided in slot 66 of the handle (shown in cross-section). A collar 68, preferably of brass, in secured to the other end of guide pin.

A collar 68 is adapted for slidable and frictional engagement with resistance wire 70 of resistor 72. The resistor is secured to the inner face of handle 46 by fasteners 74 and 74'. A metal strip 76, insulated from the body of the instrument handle by insulating strips 78 and 78', connects the lower end of the resistance wire with the positive terminal of battery 80 of appropriate voltage. The upper end of the resistance wire is open, so that initial contact between it and the collar 68 can only be established when the latter is moved downwardly from its disengaged position as shown in solid lines in FIGURE 5. The battery's potential and the resistor's capacity are so calculated that the distance which the collar is moved from the open end of resistance wire 70 in an opposite direction, namely, towards the handle's nub, will provide a current value which may be read as a length measure on the scale of an electric meter to be described below.

Battery 80 may be inserted in/or removed from the instrument handle by unscrewing a threaded metal cap 82 from the open threaded end 82' of the handle 46. Secured to the exterior of threaded cap 82 is an electrical meter 84 provided with a scale 85 calibrated metrically or according to the English system of length measurement. Electrical contact between one end of the meter and the negative terminal of the battery is effected through spring 86, which is insulated from the body of threaded cap 82 by means of insulating disc 88. The other end of the meter is grounded to the metal cap at 90, and thus to handle 46 when the cap is secured to the handle's top. An electrical circuit may be completed between the battery and the meter through resistor 72, contact ring 68, needle 56 and handle 46. FIGURE 6 illustrates this circuit diagrammatically.

To measure the depth of a pyorrhea pocket or cavity, collar 68 is moved by sliding pin 62 to the position shown in solid lines in FIGURE 5, so that the collar is clear of the resistance wire 70. The electrical circuit is now open. Since no current flows through the meter, its pointer is at the zero mark of scale 85. In the position above described the ball-like extremity 58 of depth probe needle 56 is flush with the offset extension 54 of sleeve 52. The former may be brought in contact with the upper edge of a tooth adjoining the pyorrhea pocket or cavity in a manner similar to that shown in FIGURE 1. Depth probe needle 56 is extended into the pocket or cavity by sliding guide pin 62 in slot 66 of the handle 46 until extremity 58 contacts the bottom of the pocket or cavity. Collar 68 simultaneously closes the instrument's electrical circuit by contacting the resistance wire at a point corresponding to the distance between offset end of sleeve 52 and extremity 58, as shown by dotted lines in FIGURE 5. The indicating pointer on the scale of meter 84 will move to a position corresponding to the distance which the depth probe element has entered the pyorrhea pocket or cavity. A reading may then be taken and a record made thereof.

While the instrument has been described as a self-contained unit, the invention may be carried out by utilizing standard house current instead of battery 80. Moreover, the meter may be at a remote point from the handle proper. In addition the needle 32 may be of a contrasting color, metallic or otherwise, to the color of the sleeves 18 and 52 so that the depth of needle penetration may be observed visually with respect to the sleeve end.

It is understood that the forms of the invention, herewith shown and described, are to be taken as preferred examples of the same, and that various changes in the shape, size and arrangement of parts may be resorted to, without departing from the spirit of the invention and the scope of the subjoined claims. It is furthermore understood that the device may be used extensively by dental surgeons for example in connection with root canal work and by surgeons and veterinarians in connection with their professional activities.

I claim:
1. An instrument for electrically measuring the depth of a cavity comprising in combination a straight instrument handle having a front tubular housing offset at the outer end and provided with a free edge for contact with an edge of a cavity, the depth of which is to be measured, variable resistor means, a depth probe flexible needle in slidable engagement with said handle and said tubular housing, and having an extremity adapted to movably extend into such cavity relative to said free edge, means for varying said resistor's resistance in correspondence with the distance between said free edge and said probe needle's extremity, an electric current source, and electric indicating means responsive to the variations in said resistor's resistance, said resistor, current source and indicating means being connected in electrical series.

2. An instrument for electrically measuring the depth of a cavity comprising in combination, a hallow handle having a wall portion provided with a slot, a variable electrical resistor secured in said handle, a sleeve secured to said handle and communicating with the interior of the handle, said sleeve having a free end part adapted for contact with an edge of a cavity the depth of which is to be measured, a depth probe flexible needle element slidable in said sleeve and in said handle, said probe element having an extremity adapted to movably extend into said cavity, contact means secured to said probe element slidably engaging the resistor's surface to thereby vary said resistor's resistance in correspondence with the distance between said sleeve's free end part and the probe element's extremity, a guide pin secured to said probe element, said pin being in slidable engagement with the slot in the handle's wall portion and extending therethrough, an electrical current source in said handle, and electric indicating means responsive to variations in said resistor's resistance, said resistor, current source and indicating means being connected in series.

References Cited in the file of this patent
UNITED STATES PATENTS

| | | |
|---|---|---|
| 1,688,330 | Gunther et al. | Oct. 23, 1928 |
| 2,030,244 | Cox | Feb. 11, 1936 |
| 2,219,605 | Turkel | Oct. 29, 1940 |
| 2,241,451 | Fist | May 13, 1941 |
| 2,740,404 | Kohl | Apr. 3, 1956 |
| 2,763,935 | Whaley et al. | Sept. 25, 1956 |
| 2,814,214 | Blake | Nov. 19, 1957 |

FOREIGN PATENTS

| | | |
|---|---|---|
| 624,269 | Great Britain | June 1, 1949 |